United States Patent Office 3,512,004
Patented May 12, 1970

3,512,004
RADIATION SENSITIVE DEVICE FOR POSITIONING TRUCKS
Jacques Papin, Enghien-les-Bains, Jean Bruno, Brou-sur-Chantereine, and Robert Montrelay, Versailles, France, assignors to Compagnie Generale d'Automatisme, Paris, France
Continuation-in-part of application Ser. No. 342,980, Feb. 6, 1964. This application Mar. 20, 1967, Ser. No. 624,392
Claims priority, application France, Feb. 3, 1963, 924,651
Int. Cl. G01g *19/02*
U.S. Cl. 250—223
20 Claims

ABSTRACT OF THE DISCLOSURE

Automatic device for positioning railroad cars or the like on a weigh-bridge for continued successive weighing of individual cars of a coupled line including a hauling carriage control system for advancing the line of cars in accordance with the length of the wheel base thereof and a positioning control circuit for limiting the extent of movement in accordance with the length of the wheel base of the next car to be weighed.

BACKGROUND OF THE INVENTION

Figure 1:
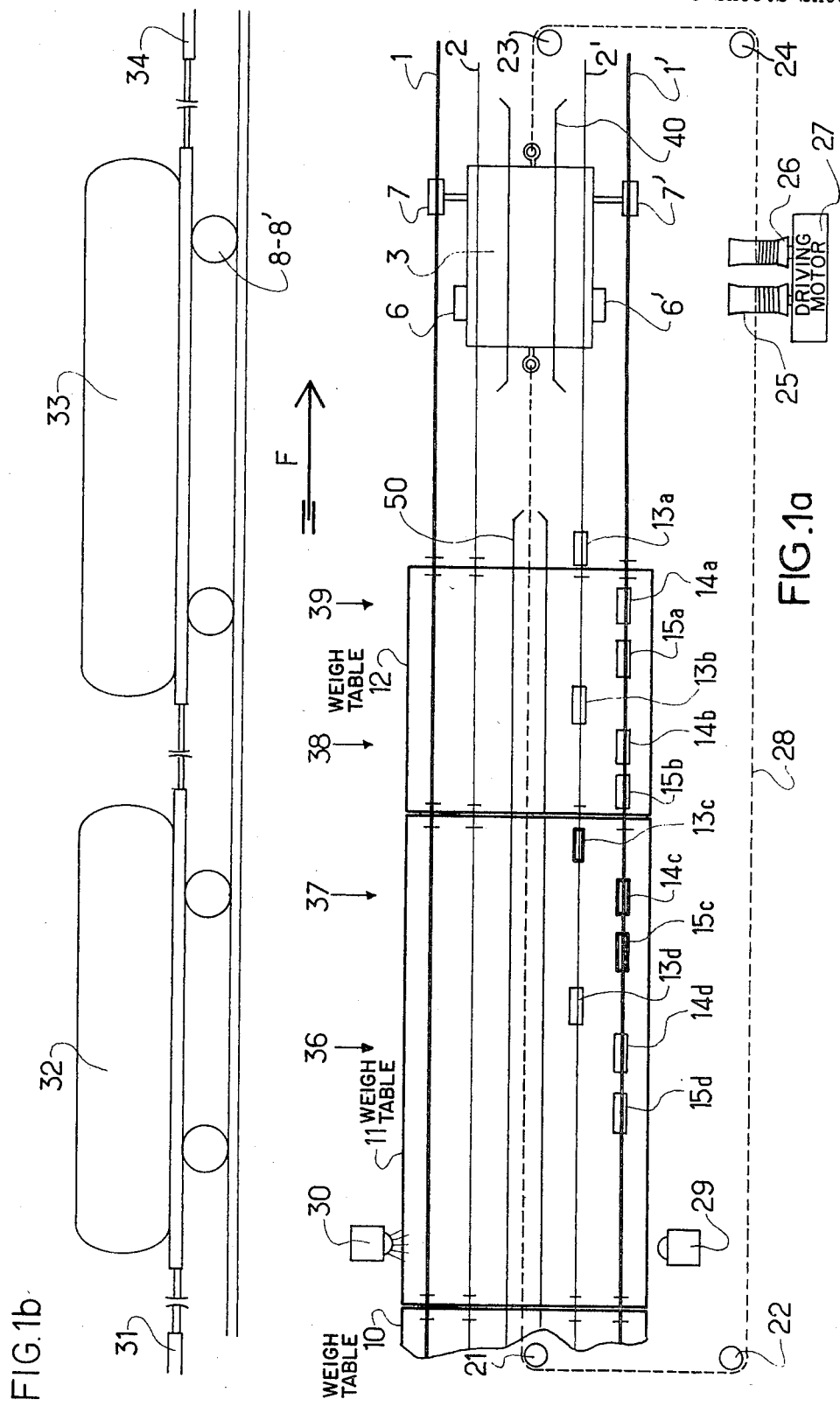

This is a continuation-in-part of application Ser. No. 342,980, filed Feb. 6, 1964 now abandoned.

The present invention relates to an automatic device for positioning vehicles, such as trucks or railroad cars intercoupled in a line, on a weigh-bridge. It is known that the operations of a controlled loading of railroad cars require two weighing steps; the first one is a taring operation which takes place prior to the loading of the car, and the second one is a weighing which takes place after loading. The difference between the results of these weighing operations furnishes the value of the net weight having been loaded.

These operations are conventionally carried out on a weigh-bridge; the weigh-bridges which are presently utilized require that the cars of the line be uncoupled for purposes of taring, that they be recoupled for the purpose of being brought to the place of loading, that they be returned to the weigh-bridge once the loading has been effected, where they are uncoupled once more for weighing, and are then recoupled, lastly, into the outgoing line. These multiple operations are necessary by reason of the fact that the distance between the wheel centers or axles of the trucks, i.e. the wheel base, varies considerably from one car to another. Since the length of the weigh-bridge is determined once and for all by the maximum possible wheel base value of a conventional car, the weighing of short cars in line is influenced by the adjacent cars, either one or several axles of which may be located on the weigh-bridge simultaneously with the car to be weighed.

BRIEF DESCRIPTION OF THE INVENTION

The present invention makes it possible to obviate these drawbacks. It is directed to an automatic device for positioning cars or the like on a weigh-bridge which consists of several independent adjoining weighing tables, which tables assure the taring and dynamic weighing of a line of coupled cars with accuracy and without the previously required multiple coupling and uncoupling operation.

The advantages and characteristics of the device proposed by the present invention will become apparent from the following description of one embodiment thereof which is given merely for purposes of illustration and is by no means limitative of the present invention.

The disclosed embodiment has reference to the weighing of railway tank cars destined for transporting hydrocarbons; but it is quite evident that the device as proposed by the present invention is applicable to the weighing of cars and trucks of any kind regardless of the type of products they transport.

In order to make possible the weighing of the cars without uncoupling the same, it is necessary to take into account both the wheel base of the cars and the length separating the rear axle of one car from the front axle of the next following car. A statistical study of these two parameters has led to the classification of the different types of conventional cars being used into seven groups according to length of wheel base. This study has rendered it possible to determine the number of tables of the weigh-bridge as well as the length of each of these tables for providing accurate weighing of conventional cars in a line of cars. The provision which has been adopted makes it possible to proceed with the weighing of coupled trucks independently of the values of the two parameters defined hereinabove. In addition, it will become clear from the specific description of the principles of the invention to be described hereinafter that a greater or lesser number of weighing tables of various lengths as compared to the embodiment specifically described herein may be provided in cases where the cars conventionally used fall into more or less than seven groups and the length of these tables may also be different than provided in the described embodiment under similar circumstances.

Furthermore, this study has made it possible to determine a limited number of stop positions of the cars on the tables of the weigh-bridge so that there are one or several tables which are influenced exclusively by the car to be weighed. Whatever the composition of the line of which the car is a part, one is thus assured of having a stop position which allows for weighing the car in question without influence from, or danger of having the result altered by the adjacent cars in the line.

The use of several tables necessitates a mechanical selector whose purpose it is to bring about the commutation and selection of the table and/or tables to be involved in the operation. However, an increase in the number of positions as regarding the selectors leads to a greater mechanical complexity which opens the door to greater inaccuracy in the measurement. For this reason, the selectors which are utilized in the embodiment described hereinabove are two-position selectors. The tables of the weigh-bridge are arranged two by two by connecting to each of the two-position selectors one measuring head which may be a photoelectric head, for example. These measuring heads supply impulses which are fed into an electronic weighing device which then records the weight of the car.

Figure 3:
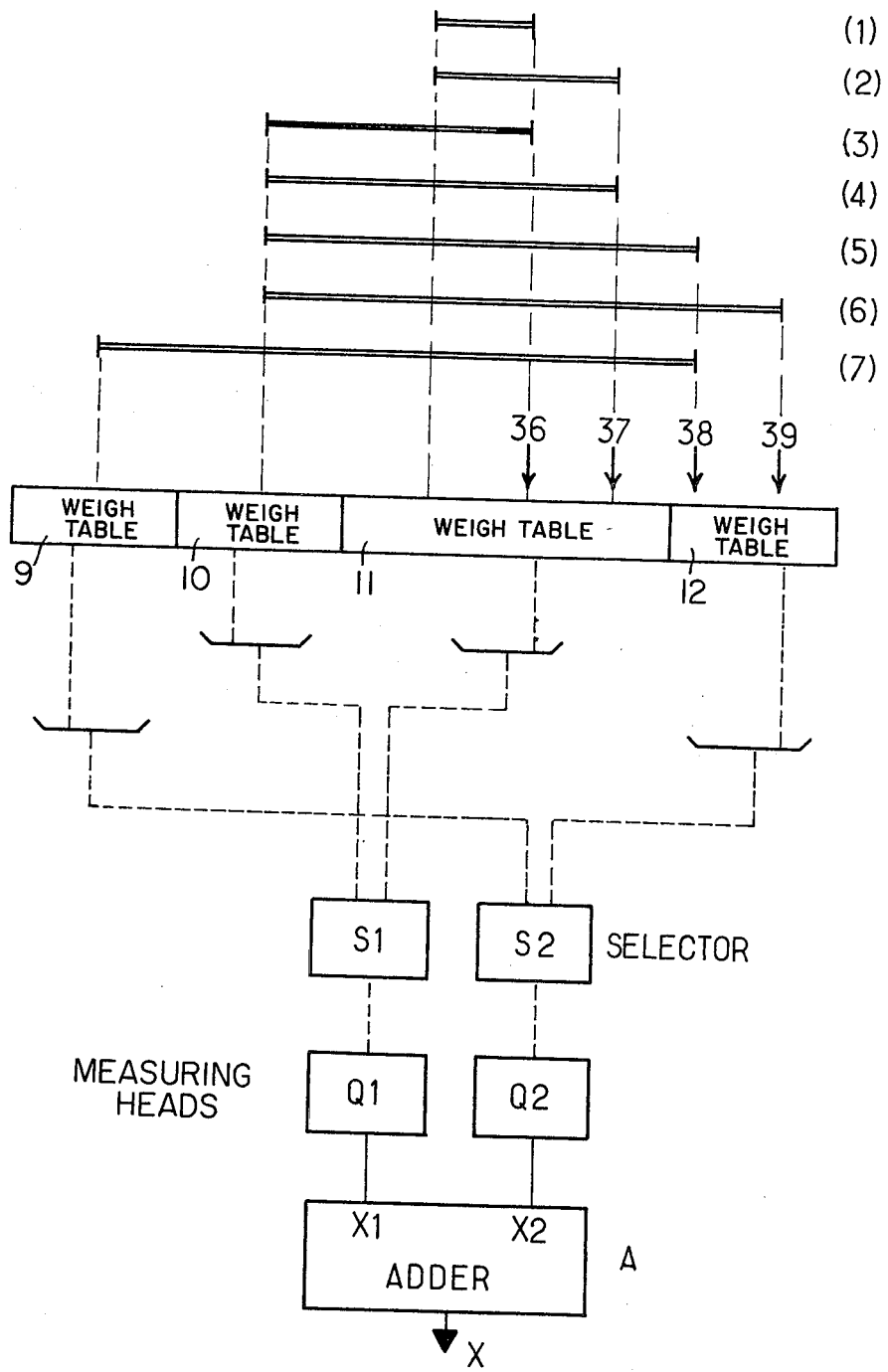
Figure 4:
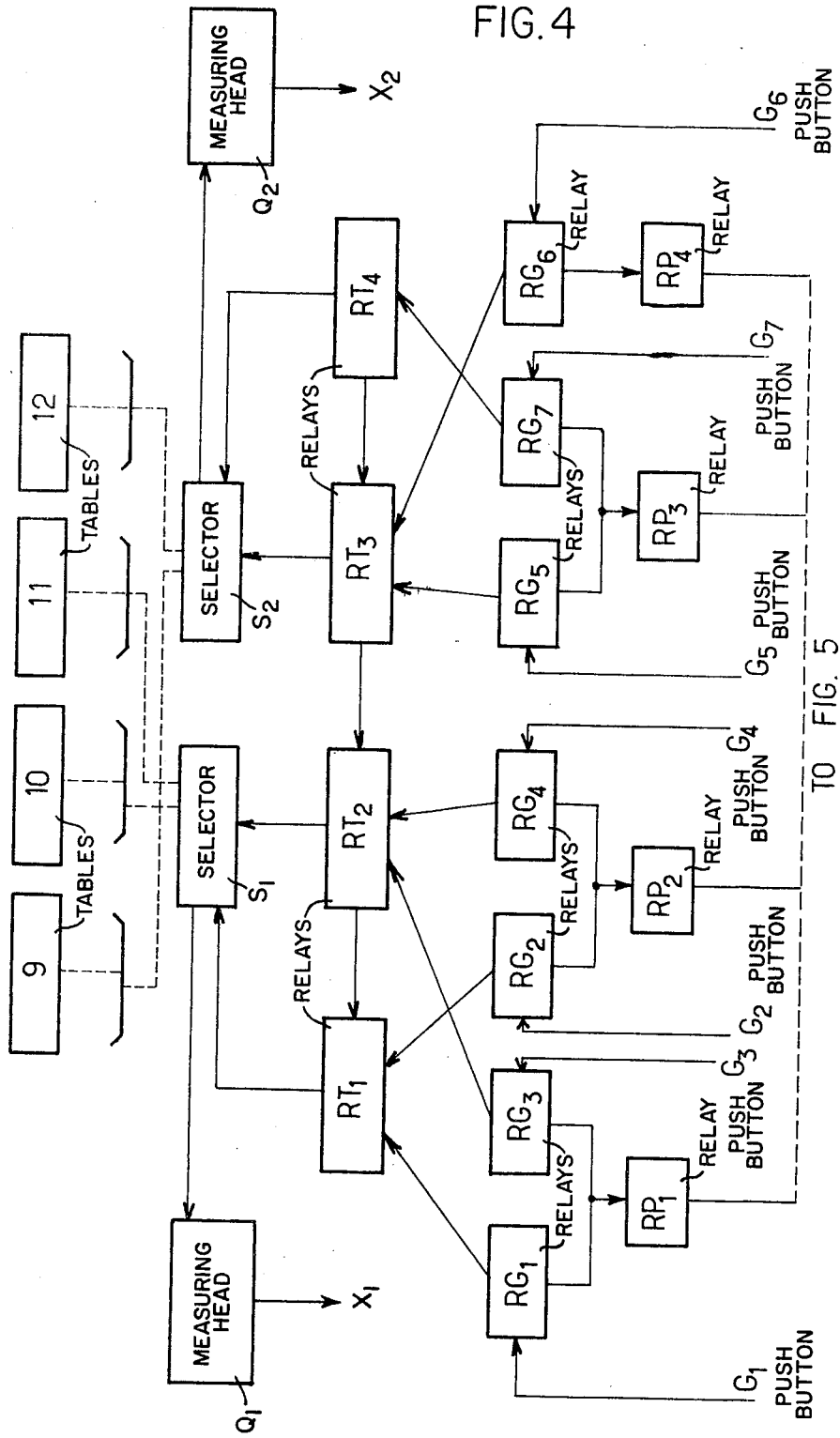
Figure 5:
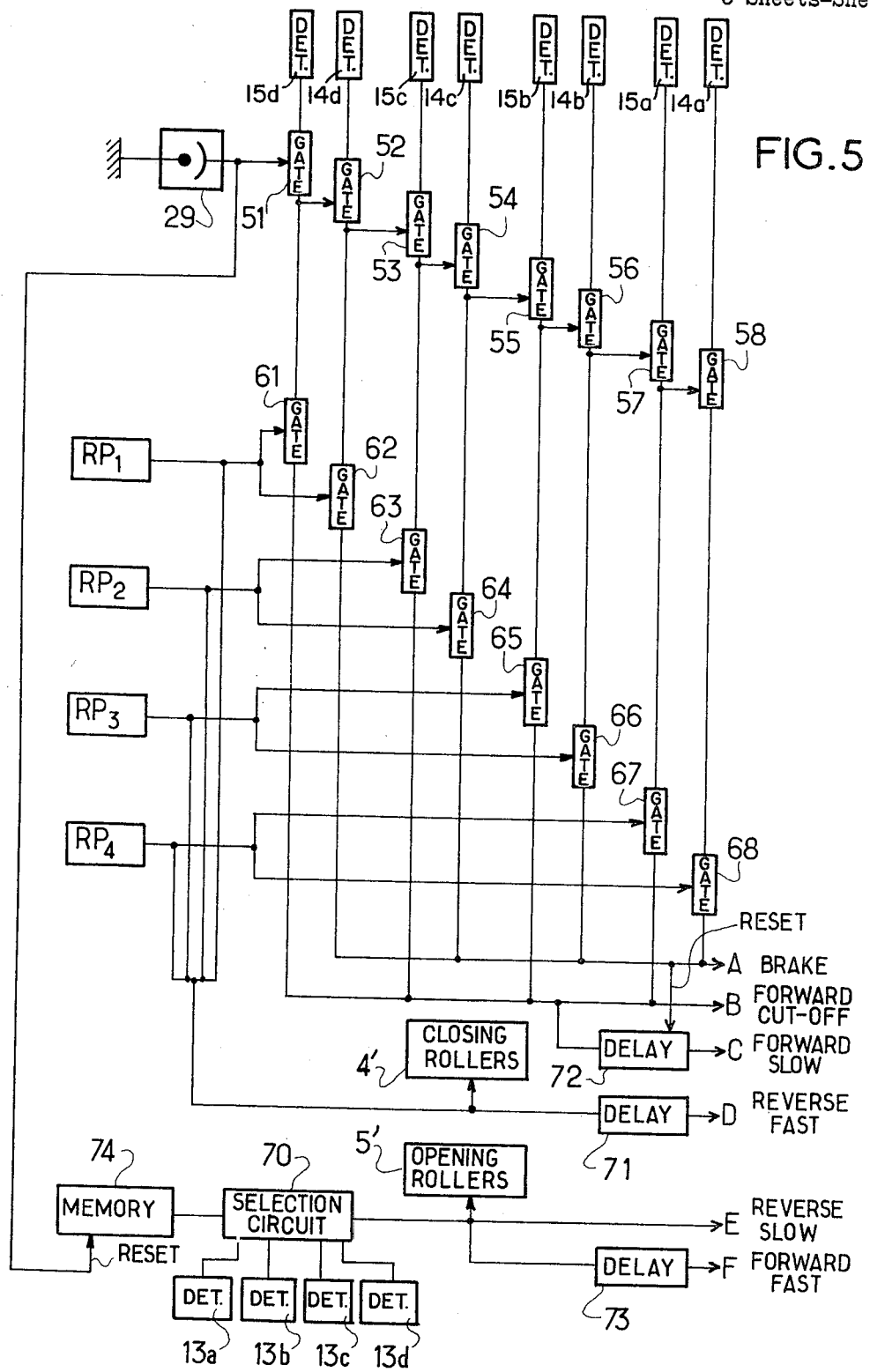

The present invention will now be further described with reference to the accompanying drawings which are given by way of example and wherein FIGS. 1a and 1b are schematic illustrations of the system proposed by the present invention;

The present invention will now be further described with reference to the accompanying drawings which are present invention;

FIG. 3 is a schematic illustration of a weigh bridge used in the system according to the present invention, and FIGS. 4 and 5 are schematic illustrations of the control circuits of the various elements of the system according to the present invention.

SPECIFIC DESCRIPTION OF THE INVENTION

Figure 2:
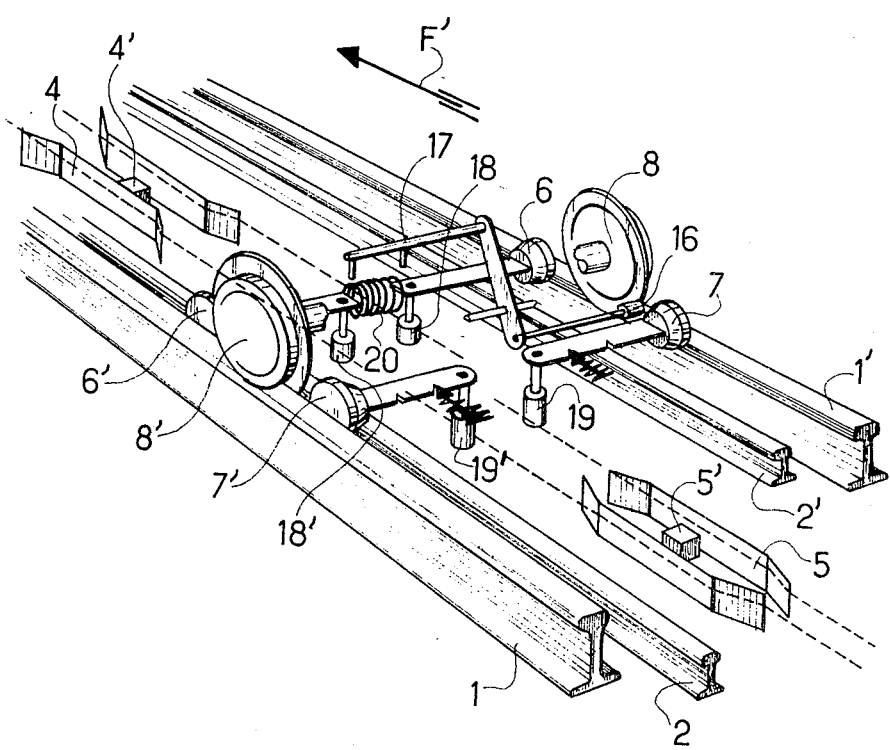

The system illustrated in FIGS. 1a and 2 comprises a weigh-bridge with four tables 9 through 12, with only tables 11 and 12 and a portion of table 10 specifically shown in FIG. 1a. Each of the tables is provided with rail portions of a principal track 1–1' on which the cars are displaced. Disposed at the inside of the principal track 1–1' is a secondary track 2–2' and displaced thereon is a carriage or crab 3 which effects the hauling or pulling of the line of cars over the weigh-bridge.

The hauling carriage or crab 3 comprises two pairs of axially retractable wheels or runners 6–6' and 7–7', respectively, which are spaced on the carriage to box in, i.e., be positioned immediately in front of and behind, both of the wheels mounted on a common axle of a car in the line to be pulled. Thus, with the two wheels on an axle of the car boxed in by the wheels 6–6' and 7–7' of the carriage, the car will be forced to move and stop with movement or stopping of the carriage.

The carriage 3 is drawn in the two directions by means of a steel cable 28 which is guided by pulleys 21, 22, 23 and 24. The extremities of the cable 28 are wound on the headstocks 25 and 26 of a capstan winch entrained by a driving motor 27 selectively providing several speeds of rotation under control by an electric control circuit.

Before proceeding with the description of the operation of the control system proposed by the present invention, the operation of the carriage 3 and that of the weigh-bridge will be briefly set forth.

Illustrated in FIG. 2 are the rails 1 and 1' of the principal track and the rails 2 and 2' of the secondary track. Reference numerals 8 and 8' identify the wheels on a common axle of the car being hauled, on the front and rear sides of which are the rollers or wheels 6–6' and 7–7' of the carriage 3, the armature of which has not been shown. This carriage is known in the art, particularly from French Pat. 1,212,092, issued Oct. 19, 1959, which discloses its full construction.

The pair of rollers 7–7' may be extended or retracted, as seen in FIG. 2, by means of dogs 19–19' extending from the ends of the roller supports, which supports may be fixed in either of two axial positions by suitable stops, whereas the rollers 6–6' are controlled by the fingers 18–18', the spring 20, and a pair of locking projections mounted on a transmission device 17. Retraction or extension of the rollers 6–6' and 7–7' is brought about by means of ramps 4 and 5 which may either be composed of stationary members, in which case the movement of the carriage will produce extension or retraction of the rollers, or they may be composed of members movable by means of a device which is schematically represented at 4' and 5', thereby rendering it possible to swing aside or to bring together the ramps 4 or 5. The means such as 4' and 5' which may, for example, take the form of electrical or fluid operated servo-mechanisms, are, in principle, remote-controlled and may be of any conventional configuration.

When the rollers 7 and 7' have been extended, the movement of the carriage in the direction of the arrow F' causes an auxiliary roller 16 to meet with and be driven by the wheel 8, and a mechanical transmission device schematically represented at 17 is actuated to thereby free the rollers 6–6', which are then extended due to the action of a spring 20. When the two pairs of rollers 6–6' and 7–7' are in the position of extension on both sides of the wheels 8 and 8', the carriage is in a position to carry or pull the car along in either direction.

As has been set forth hereinabove, the operation or procedure of weighing cars must take into account the distance between the axles of a car and the distance between the last axle and the first axle of two consecutive cars. FIG. 3 schematically illustrates a weigh-bridge set into operation as proposed by the present invention. This weigh-bridge comprises four tables 9, 10, 11 and 12 whose lengths are, respectively, 4, 4, 8, and 4 meters, for example. It is assumed that there are seven different wheel base dimensions (1) to (7) in FIG. 3 for conventional cars. To each size corresponds one of four well-determined stop positions 36 through 39 for the front axle of the car to be weighed. It is apparent from FIG. 3 that in order to distinguish between cars having a different wheel base a car of the type (1) must be stopped in the position 36 and will come to rest entirely on the table 11; a car of the type (2) will equally rest in its entirety on the table 11 but must be stopped in position 37; a car of type (3) will be stopped in position 36 but will rest on tables 10 and 11, and so forth.

It is thus obvious that a car which must be stopped in position 36 will set into operation either the table 11 alone or tables 10 and 11, a car which must be stopped in position 37 will set into operation either table 11 alone, or tables 11 and 10; a car which must be stopped in position 38 will set into operation the group of tables 10–11–12 or the group of tables 9–10–11–12, and finally, a car which must be stopped in position 39 will set into operation the group of tables 10–11–12.

The weigh-bridge proposed by the present invention comprises a mechanical device such as, for example, that described in detail in French Pat. 1,221,123, issued on Jan. 11, 1960, or in the German Pat. 926,045, issued on Nov. 25, 1961.

This mechanical device comprises two mechanical selectors $s_1$ and $s_2$. These selectors are controlled electrically and transmit the indications of the weighing of either the table 11 or of the group of tables 10 and 11 in the case of the selector $s_1$, or of table 12, or of the group 9–12 in the case of the selector $s_2$. The weighing indications of the selectors $s_1$ and $s_2$ are transmitted, respectively, to the measuring heads $Q_1$ and $Q_2$ which transform the indication of the weight into electric signals $X_1$ and $X_2$ which are eventually fed to an adding device A whose indication X corresponds—in accordance with the position of the selectors $s_1$ and $s_2$—to the indication of the weight applied to the table 11, the tables 10 and 11, the group of tables 10–11–12 or the group of tables 9–10–11–12.

The system according to the present invention thus comprises a weighing means which is adapted to weigh a car without uncoupling it from the line and without interference from adjacent cars, provided the car is placed at a predetermined stopping point. As the cars are coupled in the line in any order desired, according to the present invention, the stopping points are chosen in a manner such that the cars may be positioned one after the other without ever running backward. The pulling device, in other words, the carriage 3 and the driving motor thereof, is controlled by a circuit which makes it possible to automatically achieve the positioning of a car of any desired type by pressing on an actuating contact of the control circuit corresponding to the type of car which is to be brought on to the weigh-bridge.

Before proceeding with the description of this control circuit, it is thought to be advisable to present the sequence of the operations to be carried out.

Shown in profile in FIG. 1b is a line of cars rolling on the track 1–1' which is pulled along by the carriage 3 in the direction indicated by the arrow F. For purposes of facilitating the description of the operation of the system, it is assumed that the cars 34 and 33 have already been weighed, the car 32 being in the process of being weighed, and the car 31 will be the next car to be weighed.

It is assumed that the carriage 3 is in a position such that the rollers 6–6' and 7–7' surround or box in the wheels 8–8' of the car 33. A control device of a ramp 40 (similar to the ramp 4 in FIG. 2) causes the rollers 6–6' and 7–7' to retract by pressing dogs 18–18' and 19–19' together. The driving motor 27 is set into motion and the carriage 3 advances toward the weigh-bridge. When it passes over the detector 13c corresponding to the stopping position 37 of the car 32, the speed of the driving motor is reduced, whereas a control device (not shown in the figure) causes the ramps 50 (being analogous to the ramps 5 in FIG. 2) to swing outwardly, which has the effect of extending the rollers 7–7' which meet up with or strike against the front wheels of the car 32, the shock or impact of the rollers 7–7' pressing the roller 16 against this wheel causes the extension of the rollers 6–6', whereas the control circuit of the driving motor 27 stops the movement of the carriage 3 and then causes it to start again in the opposite direction pulling the line of cars along with it. At each stopping position on the weigh-bridge there is provided a pair of detectors sensitive to the presence of the wheels of the cars. The excitation of the detector 15d by the wheels of car 31 closes the circuit of the detector 14d whose excitation closes the circuit of the detector 15c, and so forth. Each of these detectors is connected to the control circuit of the driving motor of the carriage by means of relays which are selectively energized by a selection circuit responsive to the stopping point chosen for the car. For example, associated with the stopping position 39 is a pair of detectors 15a–14a, and associated with the position 38 are the detectors 15b–14b, etc. A photoelectric cell 29 and a luminous source 30 are disposed on both sides of the track, slightly ahead of of the last one of the detectors (15d). The cell 29 controls the energization of a relay circuit which comprises in descending order the detectors 15d, 14d, 15c, 14c, 15b, 14b, 15a, 14a, as will be described hereinafter. With this cell disposed directly in front of the detector 15d, when the rear of the car 32 passes this cell, one may be sure that the detector 15d can be excited only by the front axle of the car 31. When it is supposed that the car 31 must be stopped at the point 37 when the front axle thereof arrives at the detector 15c, the supply of the driving motor 27 is cut off and the line of cars continues its movement due to inertia. When the front axle of the car 31 arrives over the detector 14c, the winch headstocks 25–26 are braked and the car 31 is then stopped in the correct position 37. If the inertia is not sufficient to insure that the car 31 arrives at position 37, a temporary circuit (described in greater detail in connection with FIG. 5) resets the driving motor 27 into motion at a very low speed in the order of several centimeters per second and the same operation is repeated until the car arrives in position 37.

The control circuit of the elements in the system proposed by the present invention is illustrated schematically in FIGS. 4 and 5. This circuit comprises seven control push-buttons $G_1$, $G_2$, $G_3$, $G_4$, $G_5$, $G_6$, $G_7$, each of these buttons corresponding to one of a group of seven conventional cars which must be stopped at one of the four stopping points. The action upon one of these buttons has the effect of blocking the effect of the six others with the aid of a locking device or means (not shown in the figure). Each of the buttons $G_1$, $G_2$, $G_3$, $G_4$, $G_5$, $G_6$, $G_7$, controls a guard relay $RG_1$, $RG_2$, $RG_3$, $RG_4$, $RG_5$, $RG_6$, $RG_7$, respectively. Except for the relay $RG_6$, these guard relays are grouped in pairs ($RG_1$–$RG_3$, $RG_2$–$RG_4$, $RG_5$–$RG_7$). Each relay RG controls one of the table relays $RT_1$, $RT_2$, $RT_3$, $RT_4$ which, in turn, control the weighing selectors $s_1$ and $s_2$. For example, the relay $RG_1$ (being responsive to the button $G_1$) controls the relay $RT_1$ which, in turn, controls the position of the selector $s_1$ corresponding to the placing into operation of table 11 alone. The same holds true for the relay $RG_2$. The relay $RG_3$ controls the relay $RT_2$, which has two functions: The relay $RT_2$ controls the selector $s_1$, on the one hand, by actuating it in such a way as to effect the operation of the table 10 and, on the other hand, it actuates the relay $RT_1$ which, in turn, excites the selector $s_1$ for effecting the operation of the table 11. Thus, the excitation of the relay $RG_3$ causes the simultaneous operation of tables 10 and 11. The excitation of the relay $RG_4$ produces the same effect. In the same manner, the excitation of the relays $RG_5$ or $RG_6$ causes the simultaneous operation of the tables 10, 11, and 12, via relays $RT_3$, $RT_2$ and $RT_1$, while the excitation of the relay $RG_7$ causes the simultaneous operation of the tables 9, 10, 11, and 12 via relays $RT_4$, $RT_3$, $RT_2$ and $RT_1$.

After this definition of seven groups of cars, it is seen that the action on the buttons $G_1$, $G_2$, $G_3$, $G_4$, $G_5$, $G_6$, $G_7$, produces the selection of the corresponding tables. The action on the buttons $G_1$ or $G_3$ defines a first stopping point 36; action on the buttons $G_2$ and $G_4$ defines a second stopping point 37; action on buttons $G_5$ and $G_7$ defines a third stopping point 38; and finally action on the button $G_6$ defines the fourth stopping point 39. The groups $RG_1$–$RG_3$, $RG_2$–$RG_4$, $RG_5$–$RG_7$ and $RG_6$ control, respectively, relays $RP_1$, $RP_2$, $RP_3$ and $RP_4$ which are called positioning relays, each corresponding to one of the stopping points which have been defined hereinabove.

The positioning relays are connected to the control circuit which is schematically illustrated in FIG. 5. In this circuit, there has been shown the photoelectric cell 29 controlling a gate 51 inserted into the circuit connecting the detector 15d to the control terminal B of the control circuit of the driving motor 27 in FIG. 1. The terminal B corresponds to the command "forward cut-off" of the motor 27, which effects stopping of forward motion of carriage 3. The circuit of the detector 15d is connected at the output of the gate 51 to the control terminal of a gate 52 which is similar to the gate 51, but is inserted into the circuit of the detector 14d. This detector 14d is connected in turn to a terminal A which controls the braking of the driving motor 27. At the output of the gate 52, the circuit of the detector 14d is connected to a gate 53 similar to the gate 51, and so on in sequence for all of the detectors 15 and 14.

The circuit of each of these detectors comprises moreover gates such as 61 and 62, being grouped in pairs and controlled by the relays $RP_1$, $RP_2$, $RP_3$ and $RP_4$. The output of these relays is connected, furthermore, on the one hand to a control device for the retraction of the rollers of the carriage 3 (for example, the device 4' controlling the ramps 40 in FIG. 1) and, on the other hand, by means of a delaying device 71 to a terminal D, which controls the rapid backward movement of the motor 27.

The detectors 13a, 13b, 13c and 13d are connected through a selection circuit 70 to a control device for opening the rollers 7–7' of the carriage 3 (for example, the device 5' controlling the ramps 50 in FIG. 1a), directly to a terminal E controlling the slow reverse movement of the motor 27, and by means of a delaying device 73 to a terminal F which controls the rapid forward movement of the motor 27. The selection circuit 70 is controlled by a memory means 74 of any known configuration which keeps a memory of the position of the car which is being weighed on the weigh-bridge at the moment when one presses upon the button corresponding to the next car which must assume its place upon the bridge up to the moment when the rear of the truck having been weighed passes in front of the photoelectric cell 29. This portion of the circuit, in effect, remembers the position at which the last car placed on the weigh-bridge stopped so that the carriage can retrieve it after the weighing operation is complete and the next car is ready to be weighed.

It is noted finally that the control circuit for cutting off the supply of the motor 27 (terminal B) is connected to a terminal C controlling the slow forward movement or operation of the motor by means of a delaying device 72 which may be reset to zero by a reset connection which links it to the braking terminal A.

The operation of this control circuit is as follows:

Let it be assumed that the car 31 is of the type (5) and must be stopped, as seen in FIG. 3, in position 38. The action on the button $G_5$ causes the excitation of the relay $RG_5$ which, on the one hand, puts into the circuit the weighing means of the tables 10–11–12 (see FIG. 4) and, on the other hand, excites the relay $RP_3$. The latter controls the retraction of the rollers by actuating device 4'; thereafter, at the end of a certain delay as a result of delay device 71 the relay $RP_3$ controls the backward movement of the carriage 3 which passes over the detector 13c (corresponding to the position of the car 32) which is connected by means of the selection circuit 70 to the control device 5' for the extension of the rearward rollers 7-7'. At the same time, the detector 13c causes the slow operation or running of the carriage (terminal E in FIG. 5) whose rollers 7-7' will strike against the front wheels of the car 32. The action on the roller 16 frees the rear rollers 6-6' while—thanks to the delaying device 73—the carriage begins to move again forwardly (arrow F in FIG. 1a) and carries along with it the line of cars. When the rear of the car 32 passes the cell 29, the gate 51 is opened and the detector 15d being excited by the front wheels of the car 31 supplies a signal which cannot pass through the gate 61 (the relay $RP_1$ is not excited), but which does open the gate 52. The same procedure continues thereafter until the front wheels of the car 31 reach the detector 15b. Since the gate 65 is opened by the relay $RP_3$, the signal of the detector 15b is fed to the terminal B which cuts off the supply to the motor 27. The line of cars continues its movement due to inertia, and the front wheels of the car 31 reaches the detector 14b whose signal passes through the gate 56 (opened by the gate 55) and through the gate 66 (opened by the relay $RP_3$) and reaches the terminal A, which causes the braking and stopping of the car 31 in the position which has been chosen. In the case where the inertia of the line is not sufficient to insure that the front wheels of the car 31 reach the detector 14b, the signal of the detector 15b passing through the delaying device 72 resets the motor into a slow forward motion until the wheels reach the detector 14b, which causes the stopping of the line and the resetting to zero of the delaying device 72.

The control device described hereinabove allows for a precise and sure positioning of a car in a place or at a point which has been chosen beforehand by an operator, and for the simultaneous selection of the tables of the weigh-bridge, thereby rendering possible the immediate start of the operations of filling and/or weighing of the car. The group of operations is absolutely automatic, and the operator does not have to perform any operation other than that of pressing a button which corresponds to a car chosen in the line.

It is obvious that the manual control operation may be eliminated with the aid of any desired programming device. On the other hand, it is understood that the devices and circuits have been described in detail hereinbefore only by way of example, and numerous modifications are possible without departing from the spirit and scope of the present invention, such as it is set forth in the appended claims.

We claim:

1. A system for automatically and successively positioning cars of a line of coupled cars of different lengths running on a primary track on a weigh-bridge formed by several independent adjoining weighing tables comprising:
   a hauling carriage running on a secondary track inside said primary track including controllable means for selectively coupling to said cars for hauling said line of cars,
   variable speed drive means coupled to said hauling carriage for driving said hauling carriage in forward and reverse directions at controlled speeds, and
   control circuit means responsive to the movement of said cars on said primary track for controlling said drive means to effect movement by said carriage of a car to be weighed to a predetermined position on said weigh-bridge determined by the length of said car.

2. The combination defined in claim 1, wherein said control circuit means includes a plurality of pairs of detectors on said primary track at given positions along said weigh-bridge corresponding to the predetermined positions to which cars of various lengths are to be moved by said carriage for weighing, and gating means for selectively connecting one of said pair of detectors to said drive means in control thereof.

3. The combination defined in claim 2, wherein the first detector in each pair of detectors in the direction of movement of said cars provides a control signal effective to de-activate said drive means and the second detector provides a control signal effective to brake said drive means.

4. The combination defined in claim 2, wherein said control circuit means further includes selectively operable relay means connected to said gating means for selecting one of said pair of detectors to be connected to said drive means.

5. The combination defined in claim 4 wherein said control circuit means further includes selection means responsive to said relay means for enabling said weighing tables in predetermined different combinations.

6. The combination defined in claim 2 wherein said control circuit means includes additional gating means in series with said gating means between said pairs of detectors and said drive means for enabling said detectors only after passage of a car already weighed beyond said detectors in the direction of movement of said cars.

7. The combination defined in claim 6 wherein said additional gating means includes a plurality of gates, each connected to one of said detectors and further including car detector means connected to the gate of said additional gating means connected to the first detector in the direction of movement of said cars for enabling said gate in response to detection of passage of said car already weighed beyond said first detector, the output of each gate of said additional gating means enabling the next successive gate in the order of the associated detectors.

8. The combination defined in claim 1 wherein said control circuit means includes a plurality of individual detecting elements on said secondary track at given positions along said weigh-bridge adjacent to said predetermined positions to which cars of various lengths are to be moved by said carriage for weighing and selection circuit means connecting one of said detecting elements to said drive means and said controllable coupling means for effecting coupling of said carriage to a car already weighed at the predetermined position occupied by said car.

9. The combination defined in claim 8 wherein said selection circuit means includes memory means recording the predetermined position to which cars are successively moved for enabling the detecting element associated with said position in connection with each car already weighed prior to movement thereof off said weigh-bridge.

10. A system for automatically and successively positioning cars of a line of coupled cars of different lengths running on a primary track on a weigh-bridge formed by several independent adjoining weighing tables comprising:
   a hauling carriage running on a secondary track inside said primary track including controllable means for selectively coupling to said cars for hauling said line of cars,
   variable speed drive means coupled to said hauling carriage for driving said hauling carriage in forward and reverse directions at controlled speeds,
   selection means selectively settable to enable said weighing tables individually and in various combinations in accordance with the wheel base of the vehicle to be weighed, and
   position control circuit means for controlling said controllable coupling means and said drive means in response to the movement of said cars to effect transportation by said carriage of a car to be weighed to a predetermined position on said weigh-bridge determined by the wheelbase of said car.

11. The combination defined in claim 10 wherein said selection means includes a plurality of selector circuits connected in control of respective pairs of said weighing tables and each providing separate control inputs for enabling the individual weighing tables connected thereto, a table relay connected to each of said separate control inputs for actuation thereof, said table relays being connected together in series to provide for selectively enabling of said weighing tables in combinations.

12. The combination defined in claim 11 wherein said selection means further includes a plurality of guard relay means for manually actuating said table relays and a plurality of position relays actuated by a respective guard relay means.

13. The combination defined in claim 12 wherein said position control circuit means includes first means for effecting positioning of said carriage with respect to a car on said weigh-bridge having already been weighed and coupling thereto for advancing said line of cars and second means for stopping the advance of said line of cars by said carriage in response to arrival of the next car to be weighed at said predetermined position on said weigh-bridge.

14. The combination defined in claim 13, wherein said position relays are connected to said drive means to effect driving of said carriage in reverse direction, said first means including an individual detector means on said secondary track adjacent each predetermined position and connected electrically to said drive means for de-activating said drive means and stopping said carriage moving in said reverse direction upon actuation thereby.

15. The combination defined in claim 14 wherein said first means further includes selector means for enabling one of said individual detector means at a time, and memory means controlling said selector means for effecting enabling by said selector means of the detector means corresponding to the predetermined position occupied by the last car weighed.

16. The combination defined in claim 15 wherein said detector means is connected to said controllable coupling means via said selection circuit for actuation thereof, and delay means connecting the output of said selection means to said drive means, for effecting movement of said carriage in the forward direction a predetermined time after actuation of said detector means.

17. The combination defined in claim 16 wherein said second means includes a plurality of pairs of detectors on said primary track at given positions along said weigh-bridge corresponding to the predetermined positions to which cars are to be moved by said carriage for weighing, and first gating means responsive to said position relays for selectively connecting one of said pair of detectors to said drive means in control thereof.

18. The combination defined in claim 17, wherein the first detector in each pair of detectors in the direction of movement of said cars provides a control signal effective to de-activate said drive means and the second detector provides a control signal effective to brake said drive means.

19. The combination defined in claim 18 wherein said second means includes second gating means in series with said first gating means between each of said detectors and said drive means for enabling said detectors only after passage of a car already weighed beyond said detectors in the direction of movement of said cars.

20. The combination defined in claim 19 wherein said second gating means includes a plurality of gates, each connected to one of said detectors, and further including car detector means connected to the gate of said second gating means connected to the first detector in the direction of movement of said cars for enabling said gate in response to detection of passage of said car already weighed beyond said first detector, the output of each gate of said second gating means enabling the next successive gate in the order of the associated detectors.

References Cited

UNITED STATES PATENTS

| | | | |
|---|---|---|---|
| 2,723,844 | 11/1955 | Thurston | 177—163 X |
| 2,806,685 | 9/1957 | Vande Sande et al. | 177—10 |
| 3,214,581 | 10/1965 | Coley | 246—182 |

WALTER STOLWEIN, Primary Examiner

U.S. Cl. X.R.

177—163; 250—215